(12) United States Patent
Kim et al.

(10) Patent No.: US 12,510,084 B1
(45) Date of Patent: Dec. 30, 2025

(54) DUAL-MOTOR COAXIAL DIFFERENT-DIRECTION DUAL-PROPELLER STRUCTURE OF ELECTRIC PARAMOTOR

(71) Applicant: ZHEJIANG DUALTRON ESCOOTER CO., LTD., Jinhua (CN)

(72) Inventors: Bongsuck Kim, Jinhua (CN); Juho Lee, Jinhua (CN); Chingheng Chiu, Jinhua (CN); Feng Wang, Jinhua (CN)

( * ) Notice: Subject to any disclaimer, the term of this patent is extended or adjusted under 35 U.S.C. 154(b) by 0 days.

(21) Appl. No.: 19/012,703

(22) Filed: Jan. 7, 2025

(30) Foreign Application Priority Data

Nov. 20, 2024 (CN) .......................... 202411666382.1

(51) Int. Cl.
*F04D 19/02* (2006.01)
*F04D 25/06* (2006.01)
*F04D 29/34* (2006.01)

(52) U.S. Cl.
CPC ........... *F04D 19/024* (2013.01); *F04D 25/06* (2013.01); *F04D 29/34* (2013.01)

(58) Field of Classification Search
CPC ......... F04D 19/024; F04D 25/06; F04D 29/34
See application file for complete search history.

(56) References Cited

U.S. PATENT DOCUMENTS

| | | | | |
|---|---|---|---|---|
| 2,462,182 | A * | 2/1949 | Guerdan | H02K 23/60 417/69 |
| 9,995,305 | B2 * | 6/2018 | Golm, Jr. | F04D 29/665 |
| 10,370,089 | B2 * | 8/2019 | Gamble | B64C 27/52 |
| 11,840,329 | B1 * | 12/2023 | Hinman | B64U 50/19 |
| 2007/0020128 | A1 * | 1/2007 | Chang | F04D 19/007 417/423.5 |
| 2016/0272312 | A1 * | 9/2016 | Mallard | G01S 19/13 |
| 2017/0217566 | A1 * | 8/2017 | Ichinose | B64U 50/19 |
| 2020/0231275 | A1 * | 7/2020 | Groman | B64C 27/10 |
| 2021/0199119 | A1 * | 7/2021 | Guo | F04D 27/004 |
| 2023/0294825 | A1 * | 9/2023 | Lauder | B64D 27/34 244/12.3 |
| 2024/0392793 | A1 * | 11/2024 | Kang | F04D 19/007 |
| 2024/0417113 | A1 * | 12/2024 | Loh | B64U 30/24 |

* cited by examiner

*Primary Examiner* — Matthew T Largi
(74) *Attorney, Agent, or Firm* — Sandy Lipkin

(57) ABSTRACT

The present invention discloses a dual-motor coaxial different-direction dual-propeller structure of an electric paramotor. The structure comprises a cylindrical mounting shaft with a central hole inside, wherein a first brushless motor is fixedly sleeved on the mounting shaft; a first blade assembly is rotationally sleeved on the mounting shaft; a second brushless motor is fixedly sleeved on the mounting shaft; a second blade assembly is rotationally sleeved on the mounting shaft; the first blade assembly is in transmission connection with the first brushless motor; the second blade assembly is in transmission connection with the second brushless motor; and during flight, the first brushless motor and the second brushless motor respectively drive the first blade assembly and the second blade assembly to rotate in opposite directions.

7 Claims, 8 Drawing Sheets

DUAL-MOTOR COAXIAL DIFFERENT-DIRECTION DUAL-PROPELLER STRUCTURE OF ELECTRIC PARAMOTOR

REFERENCE TO PRIOR APPLICATION

This application claims priority to Chinese Patent Application 202411666382.1, filed on Nov. 20, 2024, which is incorporated herein by reference.

TECHNICAL FIELD

The present invention relates to the field of paramotors, in particular to a dual-motor coaxial different-direction dual-propeller structure of an electric paramotor.

BACKGROUND

The wing of a paramotor is the main component generating lift force and bearing load. During flight, two propellers can mutually counteract torque generated by the rotation of blades, so that no deflection force cannot be generated during operation, deflection of operators is avoided, and most paramotors adopt a double-propeller structure.

Currently, double-propeller structures on the market all adopt a single motor drive solution. For example, the patent, with an application number CN202310783778.3, discloses a multi-propeller paramotor purely driven by electricity, which comprises a frame, a propulsion device and a power supply device, wherein the propulsion device comprises a drive motor and a propeller; the propeller is positioned on the rear side of the frame; a protective frame is arranged on the frame; the drive motor comprises an outer rotor and an inner stator; an output shaft I is arranged on the outer rotor; a reversing mechanism is arranged inside the inner stator; an output shaft II is connected with the output end of the reversing mechanism; the input end of the reversing mechanism is connected to an output shaft I; the output shaft I axially penetrates through the center of the output shaft II; the output shaft I and the output shaft II can rotate relative to each other; the reversing mechanism receives power output by the output shaft I and transmits the power to the output shaft II, so that the output shaft II outputs rotating power in the opposite direction to that the output shaft I; propellers are connected with both the output shaft I and the output shaft II; and when the drive motor is started, the output shaft I and the output shaft II respectively drive the two propellers to rotate, so that the rotation directions of the two propellers are opposite, and the yaw torque generated by the two propellers can be mutually counteracted.

In the aforementioned patent, reversing is performed through a complex transmission structure, thereby ensuring that the two blades rotate in opposite directions. However, the complexity of the transmission structure can be greatly increased, and in the structure, two blades are always in synchronous state.

SUMMARY

Based on the deficiencies in the prior art, the present invention provides a dual-motor coaxial different-direction dual-propeller structure of an electric paramotor.

The technical solution adopted by the present invention to solve the aforementioned technical problems is as follows: a dual-motor coaxial different-direction dual-propeller structure of an electric paramotor comprises a cylindrical mounting shaft with a central hole inside, wherein a first brushless motor is fixedly sleeved on the mounting shaft; a first blade assembly is rotationally sleeved on the mounting shaft; a second brushless motor is fixedly sleeved on the mounting shaft; a second blade assembly is rotationally sleeved on the mounting shaft; the first blade assembly is in transmission connection with the first brushless motor; the second blade assembly is in transmission connection with the second brushless motor; and during flight, the first brushless motor and the second brushless motor respectively drive the first blade assembly and the second blade assembly to rotate in opposite directions.

Preferably, two groups of power lines are arranged in the central hole, which penetrate through the side wall of the mounting shaft and are respectively connected to the first brushless motor and the second brushless motor.

Preferably, a first stator assembly and a second stator assembly have the same structures and both comprise an annular stator winding fixed to the outer side wall of the mounting shaft.

Preferably, a first rotor assembly and a second rotor assembly have the same structures and both comprise a rotor casing and two permanent magnet blocks, with different polarities, embedded in the rotor casing, and the rotor casing surrounds the stator winding inside.

Preferably, the rotor casing comprises a first end casing, a middle casing and a second end casing, wherein the middle casing adopts an annular structure; the first end casing and the second end casing are detachably connected to openings in both ends of the middle casing; and through holes for the mounting shaft to penetrate are formed in the middles of the first end casing and the second end casing.

Preferably, both the first end casing and the second end casing comprise an outer ring body, an inner ring body, and a plurality of connecting columns arranged on the outer ring body and the inner ring body to connect the outer ring body and the inner ring body; and the connecting columns are distributed in an array to form hollow through holes among adjacent connecting columns.

Preferably, a bearing is arranged between the inner ring body and the mounting shaft, and the inner ring body is rotationally connected to the mounting shaft through the bearing.

Preferably, a plurality of mounting columns are arranged on the connecting columns, and the mounting columns penetrate through the blade assemblies and then are locked and fixed through locking pieces.

Preferably, a plurality of threaded columns are arranged on the inner wall of the mounting shaft, wherein close covers are fixed to the outer end parts of the threaded columns through screws; a mounting seat is sheathed with the inner end of the mounting shaft; a threading hole is formed in the middle of the mounting seat; an annular platform is arranged on the wall of the threading hole; the inner end of the mounting shaft is propped against the annular platform and is locked through a screw penetrating through the annular platform; a radial screw is arranged on the side wall of the mounting seat to fix the mounting seat to the mounting shaft; a plurality of mounting lugs distributed in a circular array are arranged on the outer side wall of the mounting seat; and fasteners are arranged in the mounting lugs to fix the mounting seat.

Preferably, the mounting shaft comprises a first shaft body and a second shaft body which are in butt connection, wherein the position where the first shaft body is in butt connection with the second shaft body adopts a non-circular structure; a connecting sleeve is provided to sleeve the butt connection position inside; the first shaft body and the connecting sleeve are locked and fixed through a fastener; a strip hole is formed in the second shaft body; the second shaft body is limited through a fastener penetrating through the strip hole so that the second shaft body has space for movement in the axial direction; opposite annular mounting platforms are arranged in the second shaft body and the first shaft body; and a plurality of axially extending pressure adjustable air springs are arranged between the annular mounting platforms.

Compared with the prior art, the present invention has the advantages that the present application is provided with a hollow mounting shaft; a central hole of the mounting shaft is used for wiring; in addition, two brushless motors and two blade assemblies are mounted on the mounting shaft; the two brushless motors respectively drive the two blade assemblies to rotate in opposite directions to mutually counteract torque generated when the blades rotate, so that no deflection force which can cause people to deflect is generated during operation; when the rear blade is operated, the wind can be blown forward to drive the front blade to rotate, so that the front motor is more efficient when being operated; and in addition, the hollow design can help reduce weight and improve heat dissipation capability.

BRIEF DESCRIPTION OF DRAWINGS

The present invention will be further described in detail below in conjunction with the accompanying drawings and preferred embodiments. However, those skilled in the art will understand that these drawings are only drawn for the purpose of explaining the preferred embodiments and therefore should not be taken as limiting the scope of the present invention. Furthermore, unless explicitly stated otherwise, the drawings are intended as schematic representations that conceptually depict the composition or construction of the described objects, and may include exaggerated representations; and they are not necessarily drawn to scale.

In the figures: 10, mounting shaft; 100, central hole; 101, first shaft body; 1011 and 1022, annular mounting platforms; 102, second shaft body; 1021, strip hole; 103, connecting sleeve; 104, air spring; 20, first brushless motor; 30, second brushless motor; 301, first end casing; 3010, bearing; 3011 and 3031, outer ring bodies; 3012 and 3032, connecting columns; 3013 and 3033, inner ring bodies; 302, middle casing; 303, second end casing; 3034, mounting column; 40, first blade assembly; 50, second blade assembly; 60, mounting seat; 601, mounting lug; 602, threading hole; 603, annular platform; and 70, close cover.

DETAILED DESCRIPTION OF EMBODIMENTS

A preferred embodiment of the present invention will be described in detail with reference to the accompanying drawings. It will be understood by those skilled in the art that these descriptions are merely illustrative and exemplary, and are not intended to limit the scope of protection of the present invention.

Embodiment 1

Figure 1:
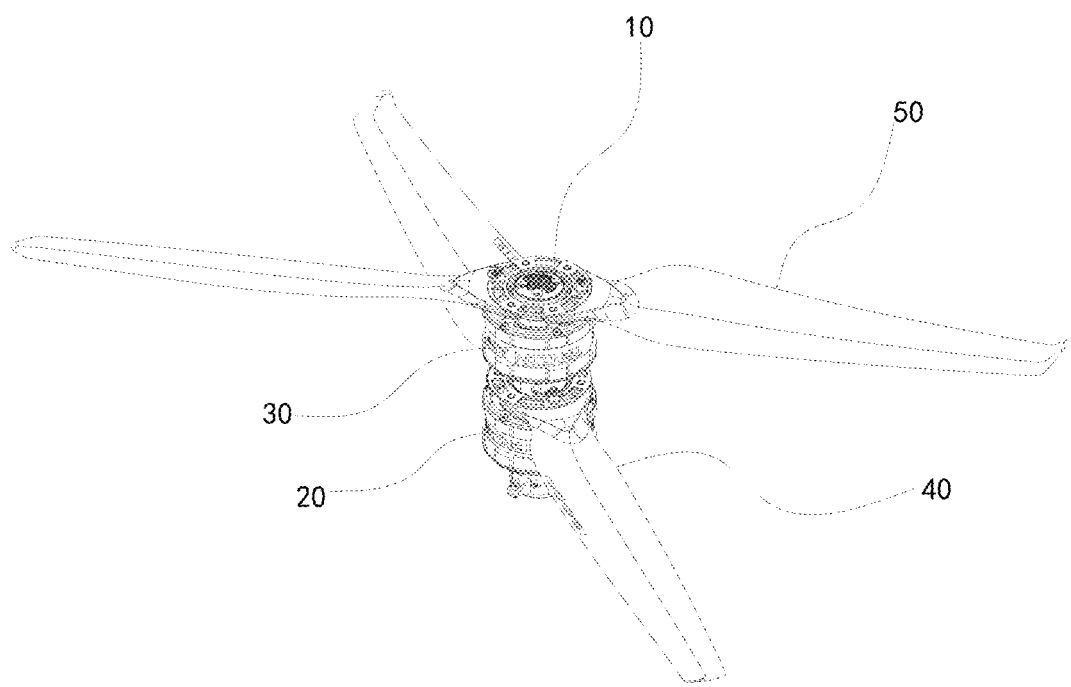
FIG. 1 is a perspective view of the present application (with the blade assemblies)
Figure 2:
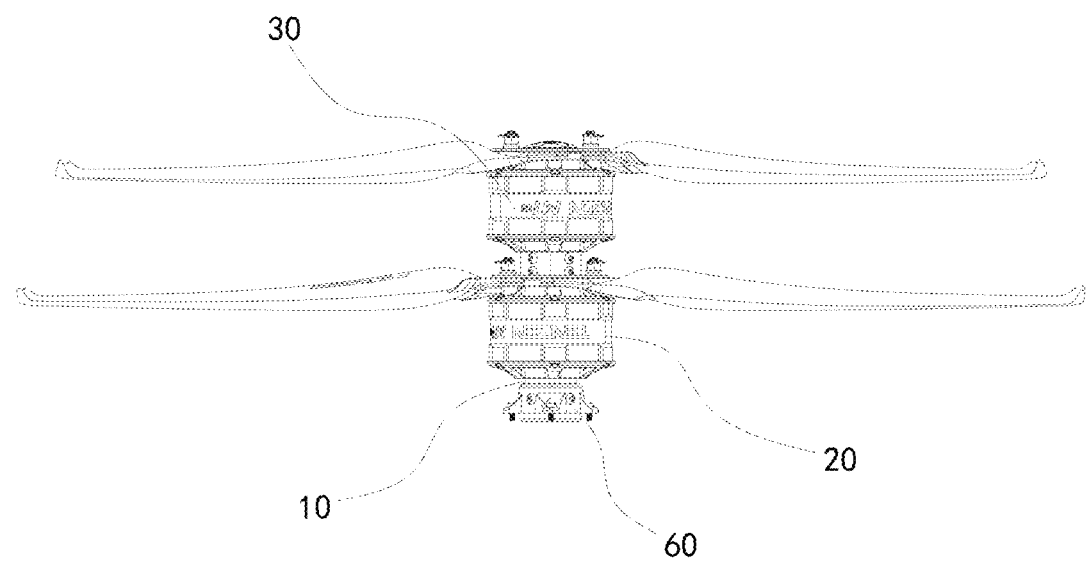
FIG. 2 is a side view of the present application (with the blade assemblies)
Figure 3:
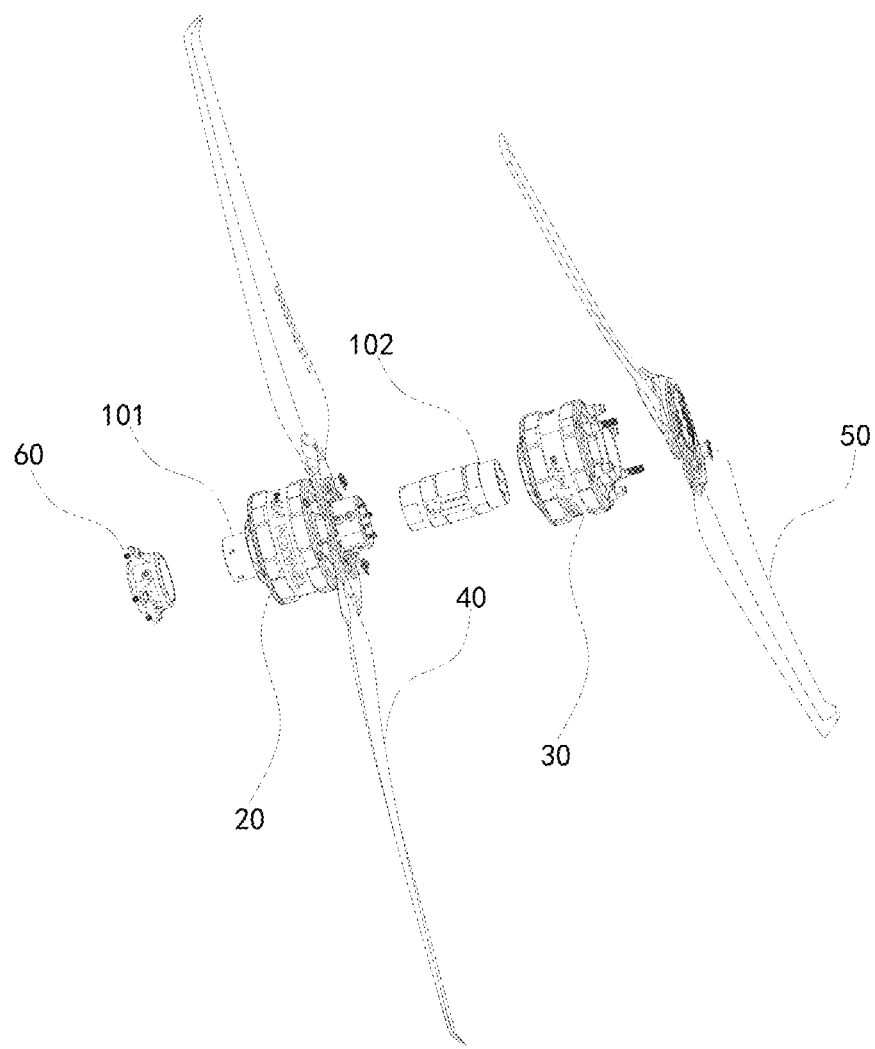
FIG. 3 is an exploded view of the present application (with the blade assemblies)
Figure 4:
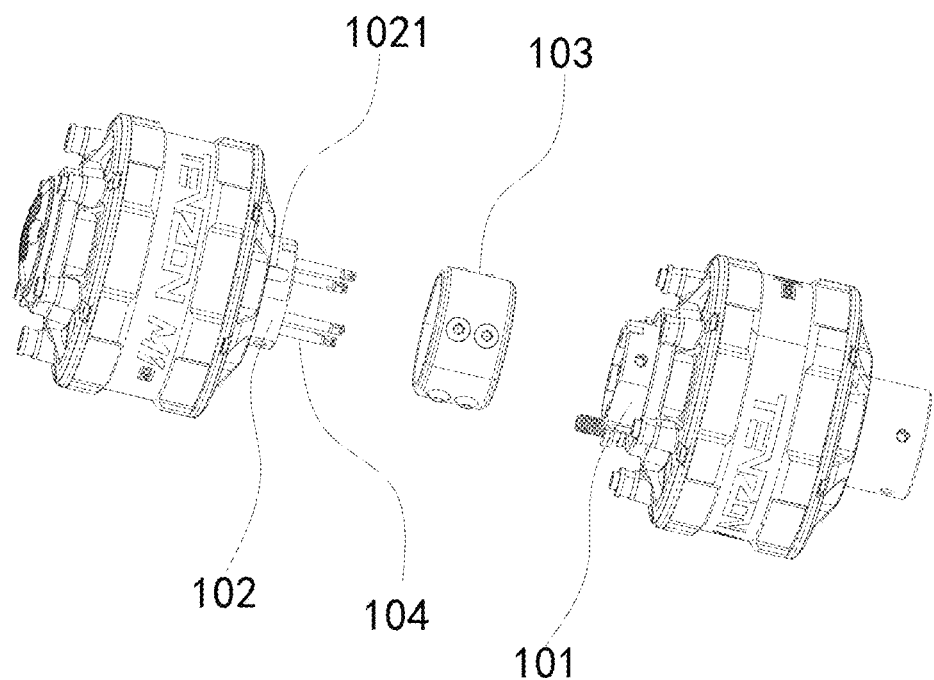
FIG. 4 is an exploded view of the present application (excluding the blade assemblies)
Figure 5:
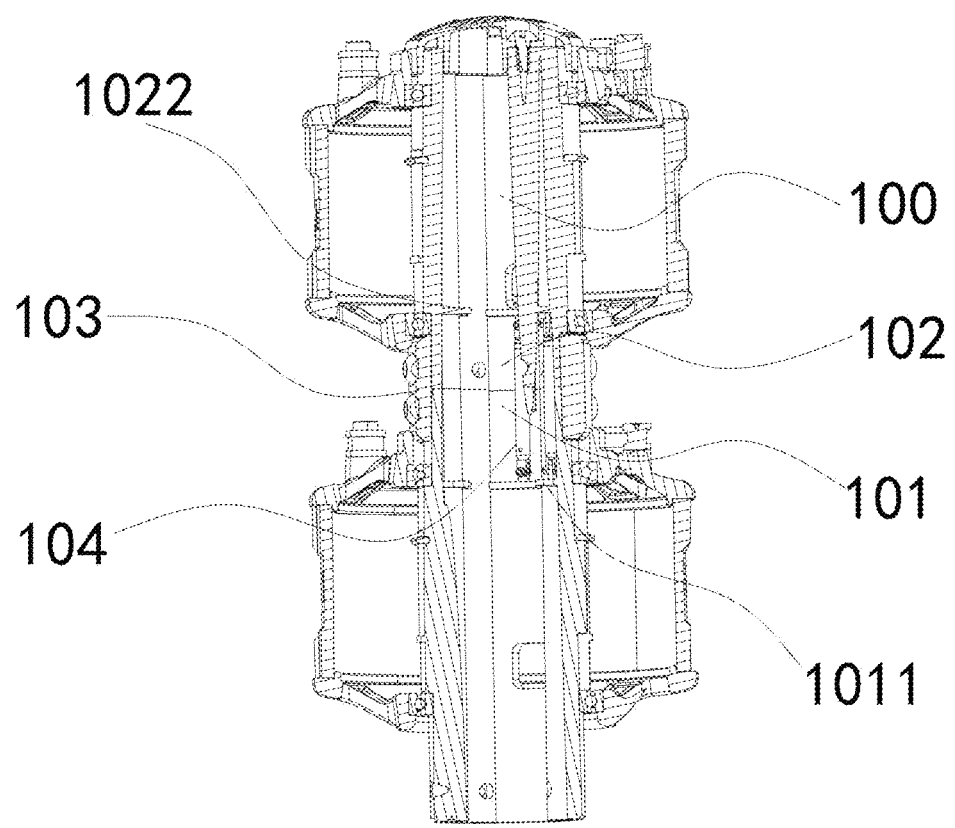
FIG. 5 is a cross-sectional view of the present application (excluding the blade assemblies)
Figure 6:
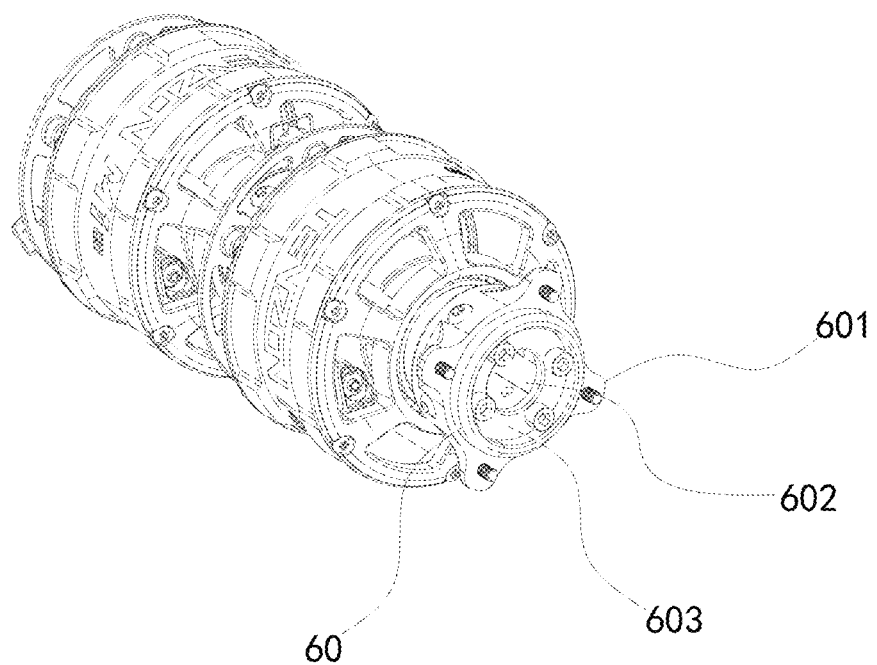
FIG. 6 is a perspective view of the present application (excluding the blade assemblies)
Figure 7:
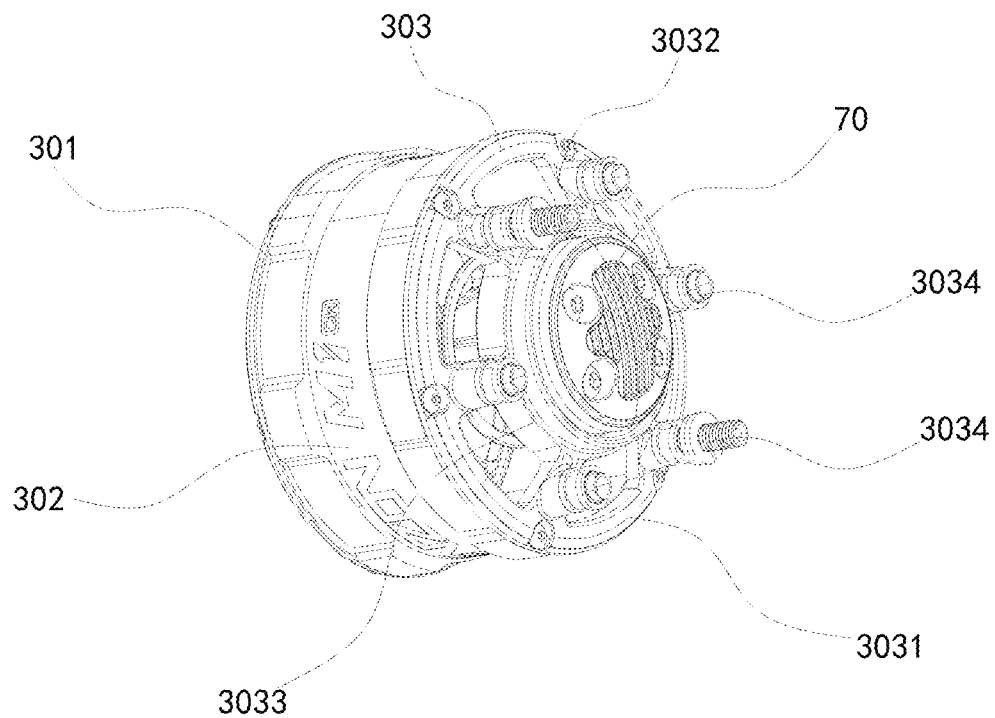
FIG. 7 and FIG. 8 are perspective views of the brushless motor.
Figure 8:
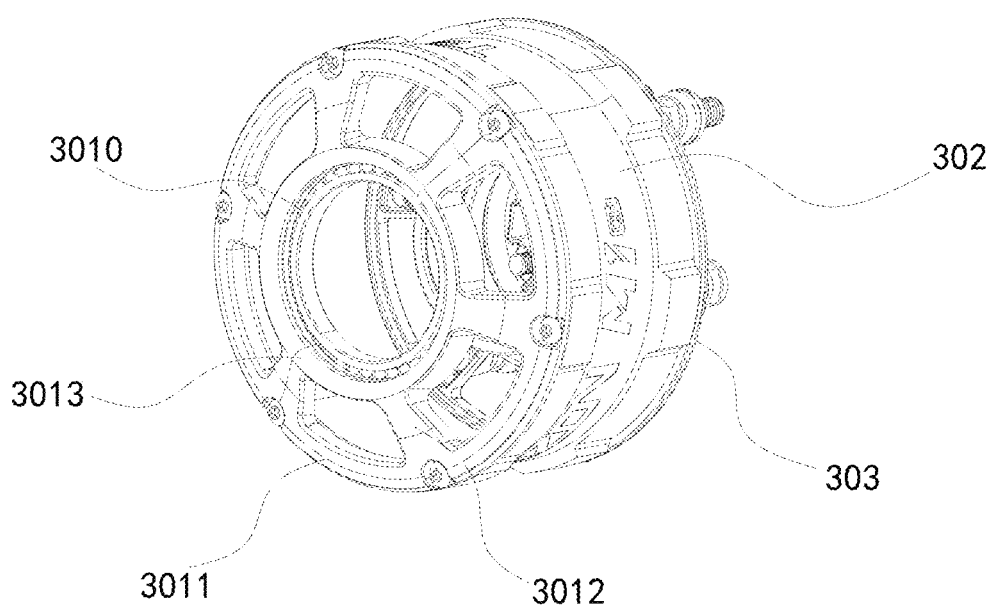

A dual-motor coaxial different-direction dual-propeller structure of an electric paramotor, as shown in FIG. 1 to FIG. 8, comprises a cylindrical mounting shaft 10 with a central hole 100 inside, wherein a first brushless motor 20 is fixedly sleeved on the mounting shaft 10; a first blade assembly 40 is rotationally sleeved on the mounting shaft 10; a second brushless motor 40 is fixedly sleeved on the mounting shaft 10; a second blade assembly 50 is rotationally sleeved on the mounting shaft 10; the first blade assembly 40 is in transmission connection with the first brushless motor 20; the second blade assembly 50 is in transmission connection with the second brushless motor 30; and during flight, the first brushless motor 20 and the second brushless motor 30 respectively drive the first blade assembly 40 and the second blade assembly 50 to rotate in opposite directions. In the solution, a hollow mounting shaft 10 is provided; a central hole 100 of the mounting shaft 10 is used for wiring; in addition, two brushless motors and two blade assemblies are mounted on the mounting shaft 10; the two brushless motors respectively drive the two blade assemblies to rotate in opposite directions to mutually counteract torque generated when the blades rotate, so that no deflection force which can cause people to deflect is generated during operation; and when the rear blade is operated, the wind can be blown forward to drive the front blade to rotate, so that the front motor is more efficient when being operated.

Preferably, two groups of power lines are arranged in the central hole 100, which penetrate through the side wall of the mounting shaft 10 and are respectively connected to the first brushless motor 20 and the second brushless motor 30. In this solution, a large space is formed inside the mounting shaft 10, which facilitates wiring.

Preferably, a first stator assembly and a second stator assembly have the same structures and both comprise an annular stator winding fixed to the outer side wall of the mounting shaft 10. In this solution, the annular stator winding is arranged outside the mounting shaft 10. Different coils are energized in different positions by switching circuits to generate different magnetic fields, thereby driving the rotor assembly to rotate. Generally, six coils are provided; two coils are set in a group; the six coils are divided into three groups, and the three groups are switched to be energized.

Preferably, a first rotor assembly and a second rotor assembly have the same structures and both comprise a rotor casing and two permanent magnet blocks, with different polarities, embedded in the rotor casing, and the rotor casing surrounds the stator winding inside. The permanent magnet blocks drive the rotor assemblies to rotate under the action of electromagnetic field generated by the coils, and the rotation of the rotor assemblies drives the blade assemblies to rotate.

Preferably, the rotor casing comprises a first end casing 301, a middle casing 302 and a second end casing 303, wherein the middle casing 302 adopts an annular structure; the first end casing 301 and the second end casing 303 are detachably connected to openings in both ends of the middle casing 302; and through holes for the mounting shaft 10 to penetrate are formed in the middles of the first end casing 301 and the second end casing 303. A space is left between the middle housing 302 and the mounting shaft 10 for mounting the rotor assemblies and the stator assemblies.

Preferably, both the first end casing 301 and the second end casing 303 comprise an outer ring body 3011 or 3031, an inner ring body 3013 or 3033, and a plurality of connecting columns 3012 or 3032 arranged on the outer ring body 3011 or 3031 and the inner ring body 3013 or 3033 to connect the outer ring body 3011 or 3031 and the inner ring body 3013 or 3033; and the connecting columns 3012 or 3032 are distributed in an array to form hollow through holes among adjacent connecting columns 3012 or 3032. The hollow through hole can enhance the heat dissipation in the position, ensuring that the brushless motors are at suitable temperature when being operated, and avoiding damage to the brushless motors due to high temperature.

Preferably, a bearing is arranged between the inner ring body 3013 or 3033 and the mounting shaft 10, and the inner ring body 3013 or 3033 is rotationally connected to the mounting shaft 10 through the bearing. This solution provides a rotational matching structure between the rotor assemblies and the mounting shaft 10. Specifically, a bearing is arranged at each of the inner ring bodies 3013 and 3033 at both ends.

Preferably, a plurality of mounting columns 3034 are arranged on the connecting columns 3012 or 3032, and the mounting columns 3034 penetrate through the blade assemblies and then are locked and fixed through locking pieces. The mounting columns 3034 are only required to be arranged on one side of each blade assembly; the mounting columns 3034 are used for mounting the blade assemblies; each blade assembly comprises two blade monomers; the locking pieces in the solution adopt locking bolts; during locking, pressure plates with circular holes are provided to press on the blade monomers; the mounting columns 3034 penetrate through the blade monomers and the circular holes and then are locked by the locking bolts; after the pressure plates are provided, a locking bolt is not required to be arranged on each mounting column 3034; and at least two locking bolts are required to fix the two blade monomers.

Preferably, a plurality of threaded columns are arranged on the inner wall of the mounting shaft 10, wherein close covers 70 are fixed to the outer end parts of the threaded columns through screws; a mounting seat 60 is sheathed with the inner end of the mounting shaft 10; a threading hole 602 is formed in the middle of the mounting seat 60; an annular platform 603 is arranged on the wall of the threading hole 602; the inner end of the mounting shaft 10 is propped against the annular platform 603 and is locked through a screw penetrating through the annular platform 603; a radial screw is arranged on the side wall of the mounting seat 60 to fix the mounting seat 60 to the mounting shaft 10; a plurality of mounting lugs 601 distributed in a circular array are arranged on the outer side wall of the mounting seat 60; and fasteners are arranged in the mounting lugs 601 to fix the mounting seat 60. The mounting seat 60 is used for being fixed to other components, such as the frame of a paramotor.

Preferably, the mounting shaft 10 comprises a first shaft body 101 and a second shaft body 102 which are in butt connection, wherein the position where the first shaft body 101 is in butt connection with the second shaft body 102 adopts a non-circular structure; a connecting sleeve 103 is provided to sleeve the butt connection position inside; the first shaft body 101 and the connecting sleeve 103 are locked and fixed through a fastener; a strip hole 1021 is formed in the second shaft body 102; the second shaft body 102 is limited through a fastener penetrating through the strip hole 1021 so that the second shaft body 102 has space for movement in the axial direction; opposite annular mounting platforms 1011 and 1022 are arranged in the second shaft body 102 and the first shaft body 101; and a plurality of axially extending pressure adjustable air springs 104 are arranged between the annular mounting platforms 1011 and 1022. In this solution, the mounting shaft 10 is set as a two-section type, which provides conditions for the separate disassembly of the two. In addition, the second shaft body 102 adopts a movable connection structure, and the screw on the second shaft body 102 can move within the range of the strip hole 1021, and supported through the air springs 104 during the movement. During flight, the air spring 104 adaptively adjusts the spacing according to the axial force. Providing a double-propeller structure during flight can cause aerodynamic interference, and adjusting the spacing is one of the ways to reduce aerodynamic interference. The sliding structure of the scheme can increase the spacing between the two blades in a small range according to the resistance and the thrust caused by the rotation of the blades during flight, thereby reducing aerodynamic interference.

It should be noted that the motor rotor and stator winding are not shown in the drawings.

The above text introduces the dual-motor coaxial different-direction dual-propeller structure of the electric paramotor provided by the present invention. In the text, the principles and implementation methods of the present invention are illustrated through the specific example. The description of the above embodiment is only used for helping understand the present invention and the core concept thereof. It should be pointed out that, for those skilled in the art, several improvements and modifications may be made to the present invention without departing from the principles of the present invention, and these improvements and modifications also fall within the protection scope of the claims of the present invention.

What is claimed is:

1. A dual-motor coaxial different-direction dual-propeller structure of an electric paramotor, the structure comprising: a cylindrical mounting shaft with a central hole inside, wherein a first brushless motor is fixedly sleeved on the mounting shaft; a first blade assembly is rotationally sleeved on the mounting shaft; a second brushless motor is fixedly sleeved on the mounting shaft; a second blade assembly is rotationally sleeved on the mounting shaft; the first blade assembly is in transmission connection with the first brushless motor; the second blade assembly is in transmission connection with the second brushless motor; and during flight, the first brushless motor and the second brushless motor respectively drive the first blade assembly and the second blade assembly to rotate in opposite directions characterized in that a first stator assembly and a second stator assembly have the same structures and both comprise an annular stator winding fixed to the outer side wall of the mounting shaft and characterized in that a first rotor assembly and a second rotor assembly have the same structures and both comprise a rotor casing and two permanent magnet blocks, with different polarities, embedded in the rotor casing, and the rotor casing surrounds the stator winding inside and characterized in that the rotor casing comprises a first end casing, a middle casing and a second end casing, wherein the middle casing adopts an annular structure; the first end casing and the second end casing are detachably connected to openings in both ends of the middle casing; and through holes for the mounting shaft to penetrate are formed in the middles of the first end casing and the second end casing.

2. The dual-motor coaxial different-direction dual-propeller structure of the electric paramotor according to claim 1, characterized in that two groups of power lines are arranged in the central hole, which penetrate through the side wall of the mounting shaft and are respectively connected to the first brushless motor and the second brushless motor.

3. The dual-motor coaxial different-direction dual-propeller structure of the electric paramotor according to claim 1, characterized in that both the first end casing and the second end casing comprise an outer ring body, an inner ring body, and a plurality of connecting columns arranged on the outer ring body and the inner ring body to connect the outer ring body and the inner ring body; and the connecting columns are distributed in an array to form hollow through holes among adjacent connecting columns.

4. The dual-motor coaxial different-direction dual-propeller structure of the electric paramotor according to claim 3, characterized in that a bearing is arranged between the inner ring body and the mounting shaft, and the inner ring body is rotationally connected to the mounting shaft through the bearing.

5. The dual-motor coaxial different-direction dual-propeller structure of the electric paramotor according to claim 3, characterized in that a plurality of mounting columns are arranged on the connecting columns, and the mounting columns penetrate through the blade assemblies and then are locked and fixed through locking pieces.

6. The dual-motor coaxial different-direction dual-propeller structure of the electric paramotor according to claim 1, characterized in that a plurality of threaded columns are arranged on the inner wall of the mounting shaft, wherein close covers are fixed to the outer end parts of the threaded columns through screws; a mounting seat is sheathed with the inner end of the mounting shaft; a threading hole is formed in the middle of the mounting seat; an annular platform is arranged on the wall of the threading hole; the inner end of the mounting shaft is propped against the annular platform and is locked through a screw penetrating through the annular platform; a radial screw is arranged on the side wall of the mounting seat to fix the mounting seat to the mounting shaft; a plurality of mounting lugs distributed in a circular array are arranged on the outer side wall of the mounting seat; and fasteners are arranged in the mounting lugs to fix the mounting seat.

7. The dual-motor coaxial different-direction dual-propeller structure of the electric paramotor according to claim 1, characterized in that the mounting shaft comprises a first shaft body and a second shaft body which are in butt connection, wherein the position where the first shaft body is in butt connection with the second shaft body adopts a non-circular structure; a connecting sleeve is provided to sleeve the butt connection position inside; the first shaft body and the connecting sleeve are locked and fixed through a fastener; a strip hole is formed in the second shaft body; the second shaft body is limited through a fastener penetrating through the strip hole so that the second shaft body has space for movement in the axial direction; opposite annular mounting platforms are arranged in the second shaft body and the first shaft body; and a plurality of axially extending pressure adjustable air springs are arranged between the annular mounting platforms.

\* \* \* \* \*